United States Patent [19]
Little

[11] 3,903,845
[45] Sept. 9, 1975

[54] WATER DISPENSING DISH FOR ANIMALS
[75] Inventor: Howard Little, Northridge, Calif.
[73] Assignee: Howard F. Little, Northridge, Calif.
[22] Filed: June 17, 1974
[21] Appl. No.: 479,858

[52] U.S. Cl. .................................................. 119/81
[51] Int. Cl.² .......................................... A01K 7/02
[58] Field of Search ............................... 119/81, 72

[56] References Cited
UNITED STATES PATENTS
638,842  12/1899  Glenn ................................. 119/81
FOREIGN PATENTS OR APPLICATIONS
193,688  3/1923  United Kingdom
272,998  6/1926  United Kingdom

*Primary Examiner*—Hugh R. Chamblee
*Attorney, Agent, or Firm*—W. B. Leach

[57] ABSTRACT

A watering dish, molded of plastic type material, for animals, such as dogs, cats and birds, is disclosed. The dish mechanism features only three parts which are a base, a water basin and a valve and valve stem. Water is automatically metered into the basin to provide a substantially constant reservoir of water for an animal.

3 Claims, 5 Drawing Figures

WATER DISPENSING DISH FOR ANIMALS

BACKGROUND

For providing water to household pets, such as dogs, cats and birds, many barnyard animals, and other classes of animals, there is a need to replenish the water consumed by the animal or lost through evaporation. It is desirable to have automatic means of the providing of such a water supply. Various approaches to automating such a supply of water for animals have been suggested.

One such approach is exemplified by the U.S. Pat. to Spencer, No. 3,333,575, which discloses a water receptacle pivoted for engagement with a resilient water supply tube which dispenses water into the water receptacle. When the receptacle is nearly full, the weight of the water in the receptacle exerts a force against the resilient water supply tube sufficient in magnitude to overcome the water supply pressure thereby preventing further flow of water. As the water is consumed or lost through evaporation, the water supply pressure will exceed the inhibiting force against the resilient water supply tube until the water level is returned to its former near-full level.

Another approach is shown in U.S. Pat. No. 1,237,725, issued to Stevenson, wherein there is provided a water supply valve housing, a valve, a lever, and a water receptacle pivoted at one end and supported by a bail at the other end. The weight of water in the receptacle exerts a force through the bail and through the lever to which the bail is affixed to force the valve into sealing engagement with the valve seat within the valve housing.

Still other approaches are shown in Johnson, U.S. Pat. No. 2,452,305 and Boterweg, U.S. Pat. No. 3,714,929.

SUMMARY OF THE INVENTION

An automatic water dispensing dish for animals includes a base within which is pivotally mounted a basin having a water reservoir. When assembled, the dish includes a valve and valve stem. In this mechanically simple structure, the weight of water in the reservoir acts through the pivoted basin to move the valve toward engagement with a valve seat formed within the base and thereby meter water into the reservoir.

DESCRIPTION OF THE PREFERRED EMBODIMENT

Figure 1:
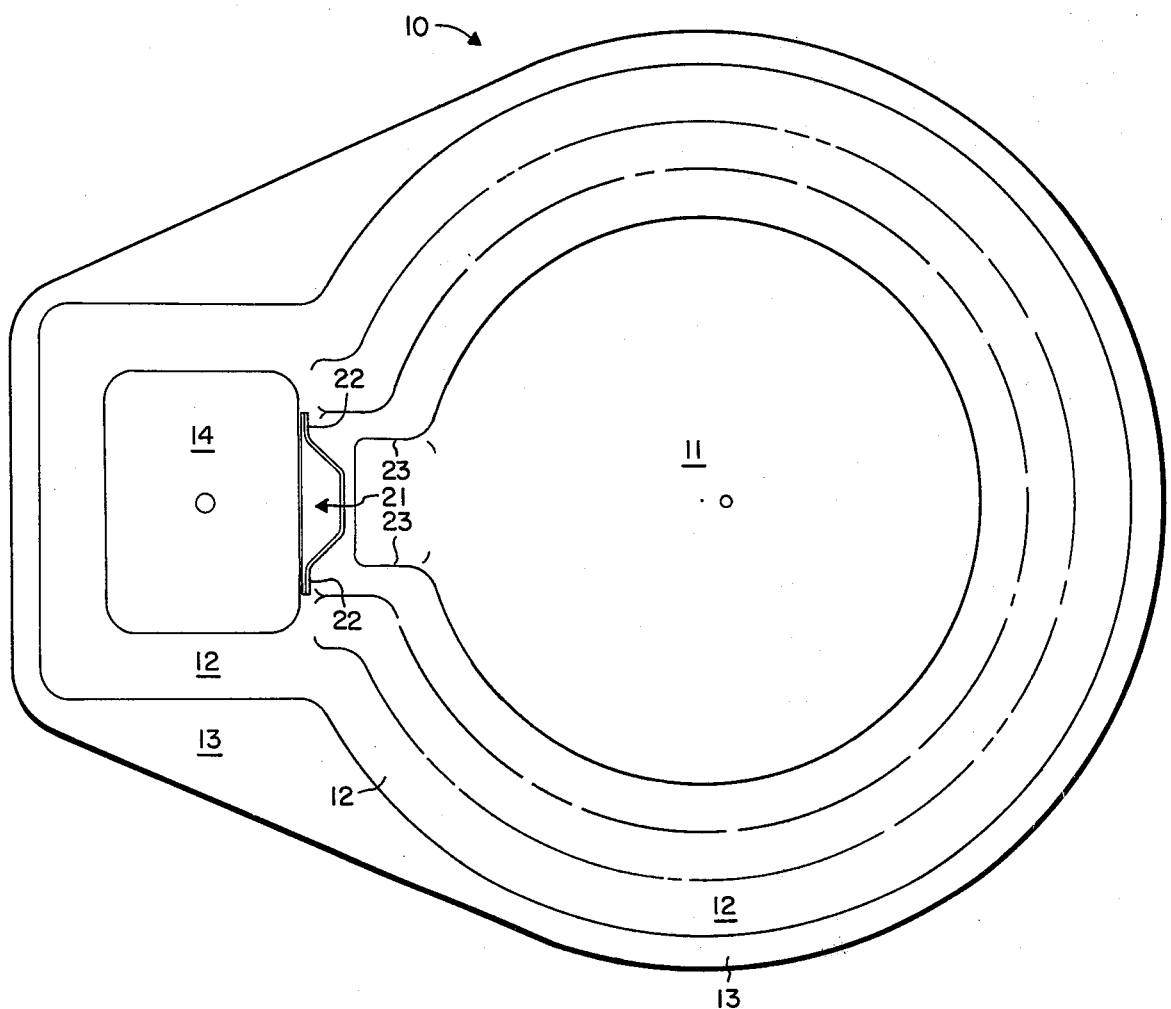
FIG. 1 is a plan view showing the base of the animal watering dish encompassing the invention herein.
Figure 2:
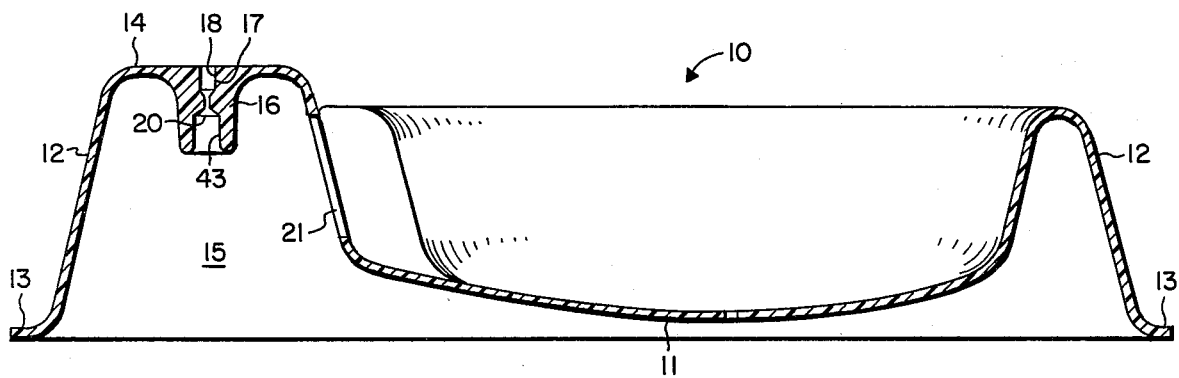
FIG. 2 is a view in elevation and cross section of the base of FIG. 1.

Referring now to FIGS. 1 and 2, there is shown the base of the animal watering dish disclosed and claimed herein. The base 10, as well as the water receptacle described below, are preferably made of a molded plastic such as polyvinyl chloride.

The base 10 includes a receptacle portion 11 which is suspended above a supporting surface by an integrally formed side wall 12 having an outwardly extending flange 13 upon which the base 10 rests.

The side wall 12 extends outwardly from the receptacle portion 11 to encircle an area which in combination with an upper wall 14 defines a chamber 15. Upper wall 14 is formed to include a valve section 16 which has formed therethrough a passageway 17. The outer end portion thereof is provided with threads 18 for engaging a water supply line. The inner end portion thereof is provided with a valve seat 20 which in combination with a valve, described below, serves as a means of controlling the flow of water to the animal watering dish.

The base 10 is further characterized by an opening 21 form through the receptacle wall thereby providing an opening into the chamber 15. Opening 21 may be further characterized by horizontal slots 22 which may, as further explained below, serve as fulcrum points for the pivoted support of the water basin portion of the watering dish.

Although it is not necessary to do so, it is preferred that the receptacle 11 include an offset 23 intermediate the main portion of the receptacle and the opening 21. This serves, in part, to guide and align the water basin.

Figure 3:
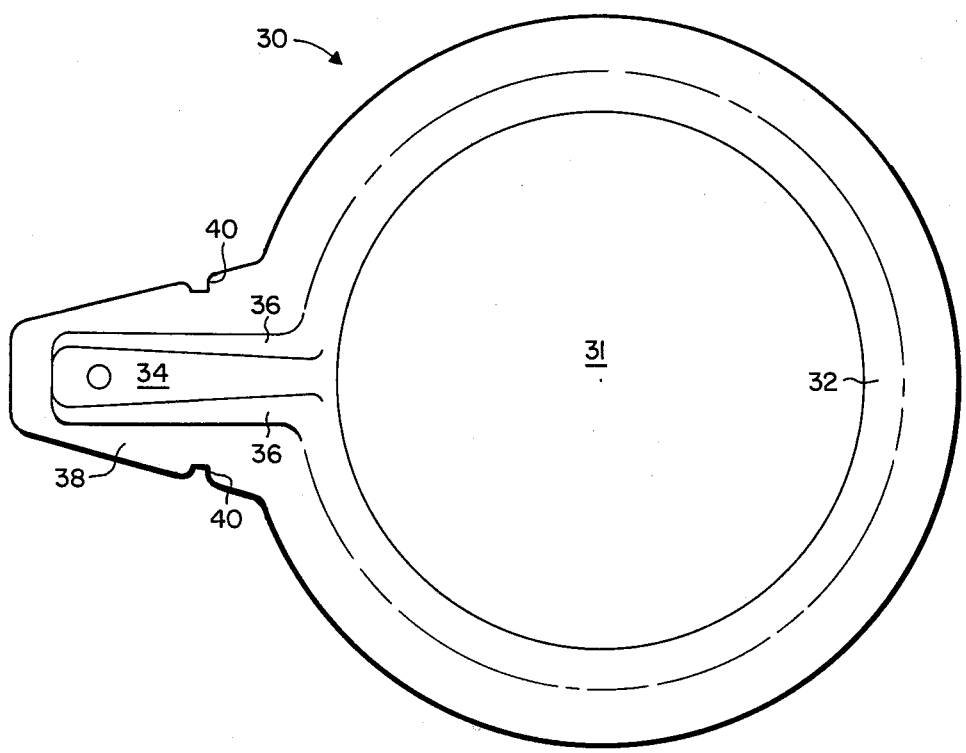
FIG. 3 is a plan view showing the water basin of the animal watering dish encompassing the invention herein.
Figure 4:
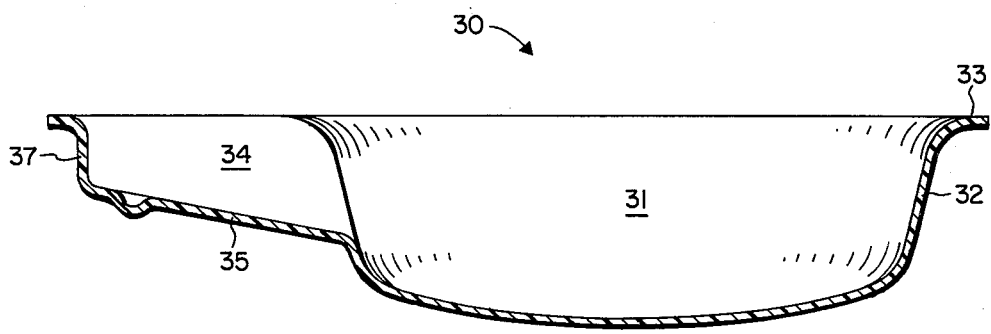
FIG. 4 is a view in elevation and cross section of the basin of FIG. 3.

Turning now to FIGS. 3 and 4, there is shown a water basin 30 which includes a water reservoir 31 having a substantially circular wall 32 terminating at its upper end in a flange portion 33. Extending radially from the reservoir 31, and in communication therewith, is a trough 34 having a bottom wall 35, side walls 36, and an end wall 37. The trough side walls 36, and end wall 37, all terminate at their upper edges in an integrally formed flange 38 which is itself integral with the reservoir flange 33. The trough flange 38 includes notch sections 40 formed therein and positioned for alignment and engagement with the slots 22, FIG. 1, which are associated with opening 21.

Figure 5:
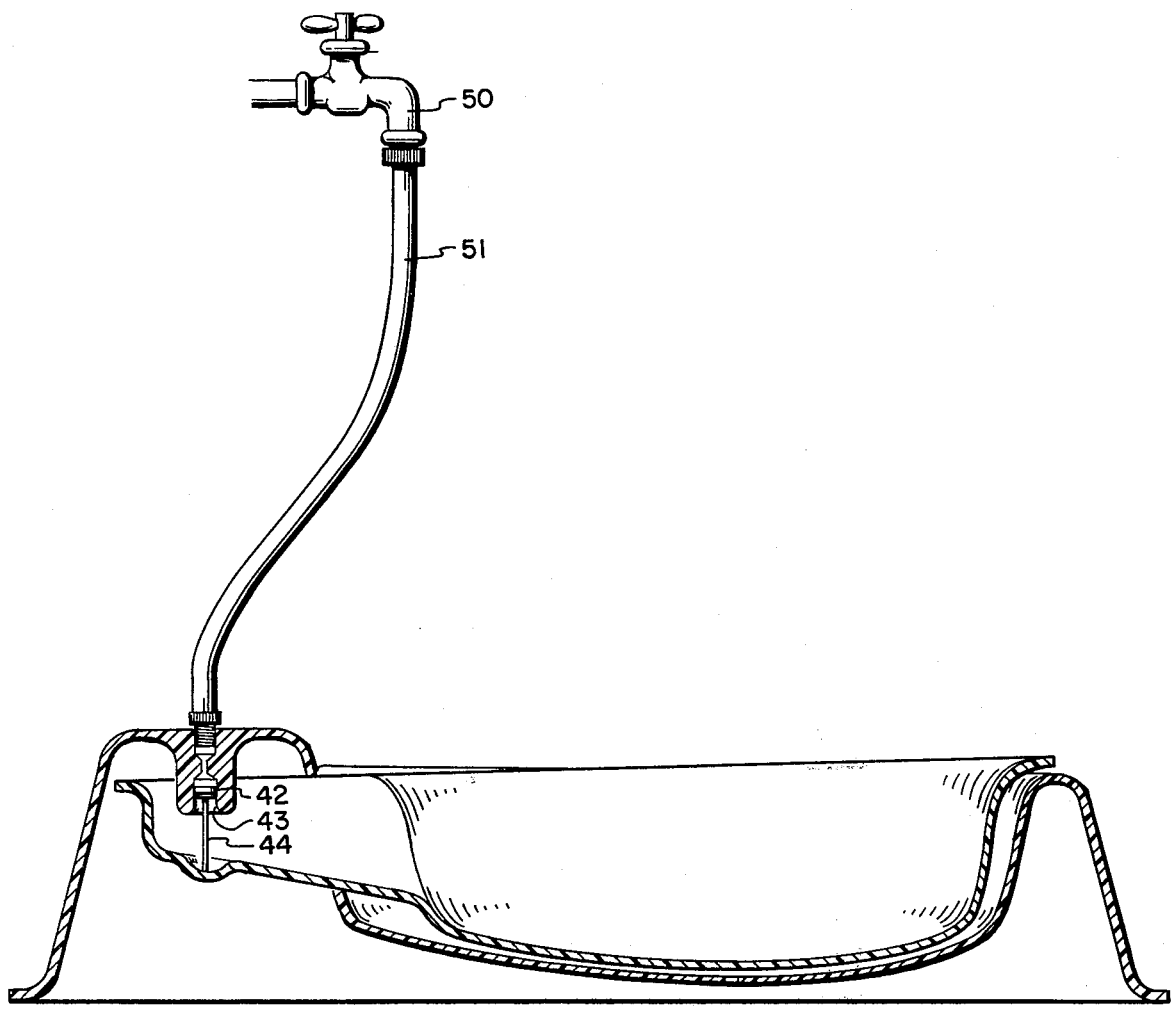
FIG. 5 is a view in elevation and cross section showing the base and water basin operably assembled.

In FIG. 5, the base 10 and basin 30 are shown assembled. The trough 34 of basin 30 is inserted through opening 21 of base 10. A valve 42, selected for sliding engagement within the lower end 43 of passageway 17 for sealing engagement with valve seat 20. Valve stem 44 is pivotally connected to the valve 42 and pivotally engages the basin trough 34. For simplicity of design, a dimple 45 formed in the bottom wall 35 of trough 34 is preferred for retaining and aligning the valve stem 44.

As can be seen from FIG. 5, the watering dish may be connected to a convenient water supply, as at 50 by means of a flexible hose.

In operation, water under pressure is supplied through passageway 17. The water pressure unseats valve 42 allowing water to flow around the valve and into the trough 34 which directs the water into the reservoir of the basin 30. When the water reaches a preselected level or quantity, the weight of the water in the reservoir acting through the fulcrum points causes the valve to seat thereby shutting off the water supply. Thereafter, any consumption of the water or loss of water will cause the valve to be unseated and the water replenished to a preselected quantity.

There has thus been disclosed a watering dish which automatically supplies a preselected quantity of water to the water reservoir of the watering dish. This is accomplished in a combination which requires a relatively few number of elements. Furthermore, the elements, when made in accordance with the disclosure herein, may be inexpensively manufactured and may be easily formed of plastic type materials.

I claim:

1. An automatic water dispensing dish for animals comprising:
   a base having integrally formed side walls defining a receptical portion therebetween and further having a housing integrally appended thereto, said housing having an upper wall having a passageway form therethrough including an inwardly facing valve seat formed therein and means for connecting a source of water under pressure thereto;
   a basin having a dish-shaped water reservoir and an integral water trough extending radially outwardly from said reservoir, said basin being pivotally connected to said base with said reservoir suspended within said base receptacle portion and said trough extending to within said base housing;
   a valve slidably mounted within said base passageway for sealing engagement therewith and having a valve stem extendinto the housing portion of said base, said base and said basin having said pivotal connection selected such that a relatively small quantity of water in said basin causes the water pressure from the water source to unseat said valve, and a relatively large quantity of water in said basin causes said basin trough to move said valve into sealing engagement with said valve seat.

2. The automatic water dispensing dish of claim 1 wherein the base further comprises:
   a receptical wall encircling said receptical portion and depending from and integrally connected to the upper edges of said base side wall and said housing upper wall, said receptical wall having an opening therein providing communication with the interior of said housing; and
   a receptical bottom wall suspended from and integrally connected to the bottom edge of said receptical wall.

3. The automatic water dispensing dish of claim 2 wherein said basin further comprises:
   a flange extending outwardly from the upper edges of said trough and having notches formed therein selectively positioned for engagement with said base and selectively aligning said basing therewith.

* * * * *